(12) United States Patent
Zhang et al.

(10) Patent No.: US 12,055,718 B2
(45) Date of Patent: Aug. 6, 2024

(54) SYSTEMS WITH WIRELESS COMMUNICATIONS

(71) Applicant: Apple Inc., Cupertino, CA (US)

(72) Inventors: Lijun Zhang, Los Gatos, CA (US); Jiangfeng Wu, San Jose, CA (US); Lu Zhang, Shanghai (CN); Mattia Pascolini, San Francisco, CA (US); Siwen Yong, San Francisco, CA (US); Yi Jiang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/166,367

(22) Filed: Feb. 8, 2023

(65) Prior Publication Data

US 2023/0333376 A1   Oct. 19, 2023

Related U.S. Application Data

(63) Continuation of application No. PCT/US2021/045791, filed on Aug. 12, 2021.

(60) Provisional application No. 63/072,004, filed on Aug. 28, 2020.

(51) Int. Cl.
*G02B 27/01*        (2006.01)
*H01Q 1/24*         (2006.01)

(52) U.S. Cl.
CPC .......... *G02B 27/017* (2013.01); *H01Q 1/241* (2013.01)

(58) Field of Classification Search
CPC ...... G02B 27/017; H01Q 1/241; H01Q 1/273; H01Q 5/40; H01Q 21/28
See application file for complete search history.

(56) References Cited

U.S. PATENT DOCUMENTS

| | | |
|---|---|---|
| 8,780,581 B2 | 7/2014 | Merz et al. |
| 9,024,823 B2 | 5/2015 | Bevelacqua |
| 9,166,279 B2 | 10/2015 | Jin et al. |
| 9,762,710 B2 | 9/2017 | Lee et al. |
| 2014/0194078 A1 | 7/2014 | Hikino |
| 2014/0203982 A1 | 7/2014 | Seo et al. |
| 2016/0018649 A1* | 1/2016 | Osterhout ............... G06T 7/529 359/630 |
| 2016/0204839 A1* | 7/2016 | Liu ........................ H04W 4/02 345/8 |
| 2017/0048363 A1* | 2/2017 | Lee ........................ H01Q 5/314 |
| 2017/0352173 A1* | 12/2017 | Salmimaa ............... G06T 11/60 |
| 2019/0075689 A1* | 3/2019 | Selvakumar .......... G02B 27/017 |
| 2019/0235621 A1* | 8/2019 | Hu ...................... G02B 27/0172 |

* cited by examiner

*Primary Examiner* — Brent D Castiaux

(74) *Attorney, Agent, or Firm* — Treyz Law Group, P.C.; Tianyi He (57) ABSTRACT

A head-mounted device may have a head-mounted housing. The head-mounted housing may have rear-facing displays that display images for a user. The images are viewable from eye boxes while the head-mounted device is being worn by the user. A peripheral conductive member may run along a peripheral edge of the front face of the housing. Dielectric-filled gaps may divide the peripheral conductive member into elongated conductive segments. The conductive segments may form antenna resonating elements for antennas on the front face. Radio-frequency transceiver circuitry such as cellular telephone transceiver circuitry may be coupled to the antennas.

20 Claims, 10 Drawing Sheets

SYSTEMS WITH WIRELESS COMMUNICATIONS

This application is a continuation of international patent application No. PCT/US2021/045791, filed Aug. 12, 2021, which claims priority to U.S. provisional patent application No. 63/072,004, filed Aug. 28, 2020, which are hereby incorporated by reference herein in their entireties.

FIELD

This relates generally to electronic devices, and, more particularly, to electronic devices such as head-mounted devices.

BACKGROUND

Electronic devices such as head-mounted devices may have displays for displaying images. The displays may be housed in a head-mounted support structure.

SUMMARY

An electronic device such as a head-mounted device may include displays for displaying visual content for a user. A head-mounted support structure may be used to support rear-facing displays. The rear-facing displays may display left and right images that are viewable through respective left and right lenses from eye boxes located at the rear of the head-mounted support structure. A forward-facing display may be mounted on a front face of the head-mounted support structure and may face away from the rear-facing displays.

The head-mounted support structure may have a peripheral conductive member such as an elongated metal member that runs along a peripheral edge of the forward-facing display on the front face. Dielectric-filled gaps such as polymer-filled gaps may divide the peripheral conductive member into multiple segments. The segments may be used in forming antenna resonating elements for antennas.

Radio-frequency transceiver circuitry in the head-mounted device may be coupled to the antennas using transmission lines. The radio-frequency transceiver circuitry may be configured to transmit and receive signals at one or more frequencies between 600 MHz and 6 GHz and/or other frequencies of interest.

The head-mounted device may have left and right cooling fans that are used to cool left and right heat sinks. The left and right heat sinks may be coupled respectively to left and right rear-facing displays. The peripheral conductive member may have openings that form airflow inlet and exit ports. The antenna resonating elements may be formed from segments that surround the airflow ports and/or that run along the edges of the airflow ports. Antenna resonating elements may also be formed from metal traces on substrates such as printed circuits.

DETAILED DESCRIPTION

Head-mounted devices include head-mounted support structures that allow the devices to be worn on the heads of users. Displays may be used for presenting a user with visual content. A head-mounted device may have rear-facing displays that display images to the user while the head-mounted device is being worn. The head-mounted device may also have a publicly viewable front-facing display. To communicate with other devices, the head-mounted device may be provided with antennas. The antennas may be formed from housing structures such as a display bezel, frame member, or other conductive housing structures.

Figure 1:
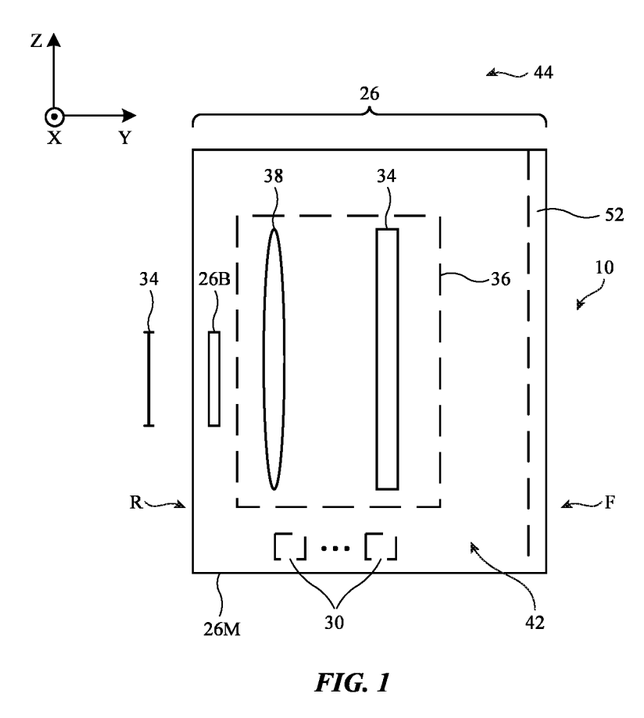
FIG. 1 is a side view of an illustrative electronic device such as a head-mounted device in accordance with an embodiment.

FIG. 1 is a side view of an illustrative head-mounted electronic device. As shown in FIG. 1, head-mounted device 10 may include head-mounted support structure 26. Support structure 26, which may sometimes be referred to as a housing or enclosure, may have walls or other structures that separate an interior region of device 10 such as interior region 42 from an exterior region surrounding device 10 such as exterior region 44. Electrical components 30 (e.g., integrated circuits, sensors, control circuitry, input-output devices, etc.) may be mounted on printed circuits and/or other structures within device 10 (e.g., in interior region 42).

To present a user with images for viewing from eye boxes such as eye box 34, device 10 may include displays such as display 14 and lenses such as lens 38. These components may be mounted in optical modules such as optical module 36 (e.g., a lens barrel) to form respective left and right optical systems. There may be, for example, a left display for presenting an image through a left lens to a user's left eye in a left eye box and a right display for presenting an image to a user's right eye in a right eye box. The user's eyes are located in eye boxes 34 when rear face R of structure 26 rests against the outer surface of the user's face.

Support structure 26 may include a main housing support structure such as portion 26M. Main housing portion 26M may have a portion on front face F of device 10. A forward-facing publicly viewable display such as display 52 may be mounted on front side F of portion 26M. Display 52 may face away from rear-facing displays 14. Display 52 may lie generally in the X-Z plane of FIG. 1. The outer peripheral edge of display 52 may be surrounded by a peripheral conductive member. The peripheral conductive member, which may run along the peripheral edge of front face F and which may serve as a display bezel for display 52, may have a ring shape when viewed along the −Y direction. If desired, support structure 26 may include optional head straps (sometimes referred to as headbands) such as strap 26B and/or other head-mounted support structures that are configured to extend around the head of the user to help support device 10 on the head of the user during use.

Figure 2:
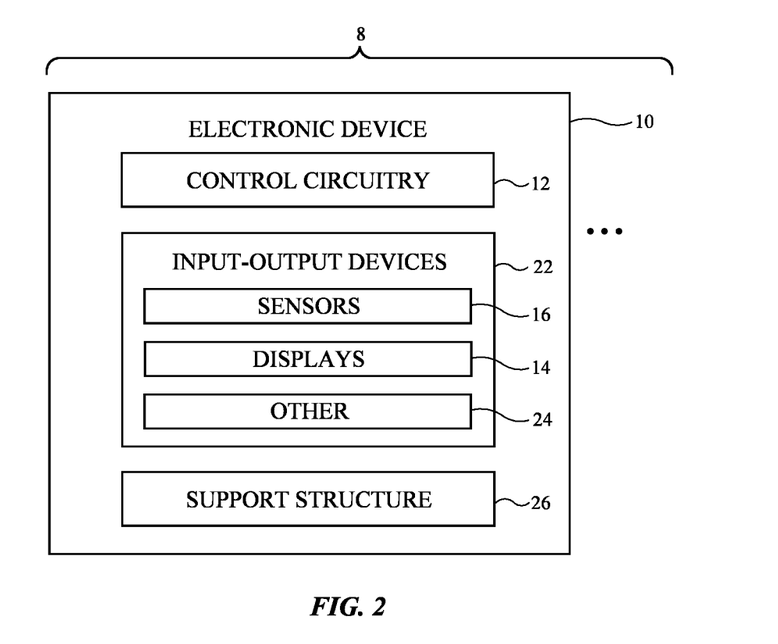
FIG. 2 is schematic diagram of an illustrative system with an electronic device in accordance with an embodiment.

A schematic diagram of an illustrative system that may include a head-mounted device is shown in FIG. 2. As shown in FIG. 2, system 8 may have one or more electronic devices 10. Devices 10 may include a head-mounted device (e.g., device 10 of FIG. 1), accessories such as headphones, associated computing equipment (e.g., a cellular telephone, tablet computer, laptop computer, desktop computer, and/or remote computing equipment that supplies content to a head-mounted device), and/or other devices that communicate with the head-mounted device.

Each electronic device 10 may have control circuitry 12. Control circuitry 12 may include storage and processing circuitry for controlling the operation of device 10. Circuitry 12 may include storage such as hard disk drive storage, nonvolatile memory (e.g., electrically-programmable-read-only memory configured to form a solid-state drive), volatile memory (e.g., static or dynamic random-access-memory), etc. Processing circuitry in control circuitry 12 may be based on one or more microprocessors, microcontrollers, digital signal processors, baseband processors, power management units, audio chips, graphics processing units, application specific integrated circuits, and other integrated circuits. Software code may be stored on storage in circuitry 12 and run on processing circuitry in circuitry 12 to implement control operations for device 10 (e.g., data gathering operations, operations involving the adjustment of the components of device 10 using control signals, etc.). Control circuitry 12 may include wired and wireless communications circuitry. For example, control circuitry 12 may include radio-frequency transceiver circuitry such as cellular telephone transceiver circuitry, wireless local area network transceiver circuitry (e.g., WiFi® circuitry), millimeter wave transceiver circuitry, and/or other wireless communications circuitry.

To support interactions with external equipment, control circuitry 12 may be used in implementing communications protocols. Communications protocols that may be implemented using control circuitry 12 include internet protocols, wireless local area network protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.1 lad protocols, cellular telephone protocols, multiple-input and multiple-output (MIMO) protocols, antenna diversity protocols, satellite navigation system protocols such as global positioning system (GPS) protocols and global navigation satellite system (GLONASS) protocols, IEEE 802.15.4 ultra-wideband communications protocols or other ultra-wideband communications protocols, etc. Each communications protocol may be associated with a corresponding radio access technology (RAT) that specifies the physical connection methodology used in implementing the protocol.

During operation, the communications circuitry of the devices in system 8 (e.g., the communications circuitry of control circuitry 12 of device 10) may be used to support communication between the electronic devices. For example, one electronic device may transmit video data, audio data, and/or other data to another electronic device in system 8. Electronic devices in system 8 may use wired and/or wireless communications circuitry to communicate through one or more communications networks (e.g., the internet, local area networks, etc.). The communications circuitry may be used to allow data to be received by device 10 from external equipment (e.g., a tethered computer, a portable device such as a handheld device or laptop computer, online computing equipment such as a remote server or other remote computing equipment, or other electrical equipment) and/or to provide data to external equipment.

Device 10 may include input-output devices 22. Input-output devices 22 may be used to allow a user to provide device 10 with user input. Input-output devices 22 may also be used to gather information on the environment in which device 10 is operating. Output components in devices 22 may allow device 10 to provide a user with output and may be used to communicate with external electrical equipment.

As shown in FIG. 2, input-output devices 22 may include one or more displays such as displays 14. In some configurations, device 10 includes left and right display devices. Device 10 may, for example, include left and right components such as left and right scanning mirror display devices or other image projectors, liquid-crystal-on-silicon display devices, digital mirror devices, or other reflective display devices, left and right display panels based on light-emitting diode pixel arrays (e.g., organic light-emitting display panels or display devices based on pixel arrays formed from crystalline semiconductor light-emitting diode dies), liquid crystal display panels, and/or or other left and right display devices that provide images to left and right eye boxes for viewing by the user's left and right eyes, respectively.

During operation, displays 14 may be used to display visual content for a user of device 10. The content that is presented on displays 14 may include virtual objects and other content that is provided to displays 14 by control circuitry 12. This virtual content may sometimes be referred to as computer-generated content. Computer-generated content may be displayed in the absence of real-world content or may be combined with real-world content. In some configurations, a real-world image may be captured by a camera (e.g., a forward-facing camera, sometimes referred to as a front-facing camera) so that computer-generated content may be electronically overlaid on portions of the real-world image (e.g., when device 10 is a pair of virtual reality goggles).

Input-output circuitry 22 may include sensors 16. Sensors 16 may include, for example, three-dimensional sensors (e.g., three-dimensional image sensors such as structured light sensors that emit beams of light and that use two-dimensional digital image sensors to gather image data for three-dimensional images from light spots that are produced when a target is illuminated by the beams of light, binocular three-dimensional image sensors that gather three-dimensional images using two or more cameras in a binocular imaging arrangement, three-dimensional light detection and ranging sensors, sometimes referred to as lidar sensors, three-dimensional radio-frequency sensors, or other sensors that gather three-dimensional image data), cameras (e.g., infrared and/or visible digital image sensors), gaze tracking sensors (e.g., a gaze tracking system based on an image sensor and, if desired, a light source that emits one or more beams of light that are tracked using the image sensor after reflecting from a user's eyes), touch sensors, capacitive proximity sensors, light-based (optical) proximity sensors, other proximity sensors, force sensors (e.g., strain gauges, capacitive force sensors, resistive force sensors, etc.), sensors such as contact sensors based on switches, gas sensors, pressure sensors, moisture sensors, magnetic sensors, audio sensors (microphones), ambient light sensors, microphones for gathering voice commands and other audio input, sensors that are configured to gather information on motion, position, and/or orientation (e.g., accelerometers, gyroscopes, compasses, and/or inertial measurement units that include all of these sensors or a subset of one or two of these sensors), and/or other sensors.

User input and other information may be gathered using sensors and other input devices in input-output devices 22. If desired, input-output devices 22 may include other devices 24 such as haptic output devices (e.g., vibrating components), light-emitting diodes and other light sources, speakers such as ear speakers for producing audio output, circuits for receiving wireless power, circuits for transmitting power wirelessly to other devices, batteries and other energy storage devices (e.g., capacitors), joysticks, buttons, and/or other components.

Electronic device 10 may have head-mounted support structures such as head-mounted support structure 26 (e.g., head-mounted housing structures such as housing walls, straps, etc.). The head-mounted support structure may be configured to be worn on a head of a user (e.g., against the user's face covering the user's eyes) during operation of device 10 and may support displays 14, sensors 16, other components 24, other input-output devices 22, and control circuitry 12 (see, e.g., components 30 and optical module 36 of FIG. 1).

Figure 3:
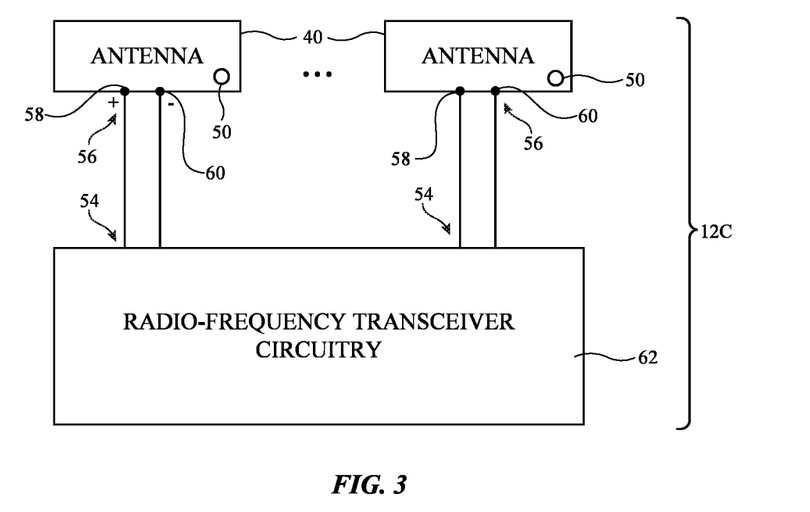
FIG. 3 is a diagram of illustrative wireless communications circuitry for an electronic device in accordance with an embodiment.

FIG. 3 is a diagram of illustrative wireless communications circuitry for device 10. Wireless circuitry 12C of FIG. 3 may include radio-frequency transceiver circuitry 62 for handling various radio-frequency communications bands. Transceiver circuitry 62 may include wireless local area network (WLAN) and wireless personal area network (WPAN) transceiver circuitry. Transceiver circuitry 62 may handle 2.4 GHz and 5 GHz bands for WiFi® (IEEE 802.11) communications or other WLAN bands and may handle the 2.4 GHz Bluetooth® communications band or other WPAN bands. Circuitry 62 may also include cellular telephone transceiver circuitry for handling wireless communications in frequency ranges (communications bands) between 600 MHz and 6 GHz and/or other cellular communications bands such as a cellular low band (LB) from 600 to 960 MHz, a cellular low-midband (LMB) from 1410 to 1510 MHz, a cellular midband (MB) from 1710 to 2170 MHz, a cellular high band (HB) from 2300 to 2700 MHz, a cellular ultra-high band (UHB) from 3300 to 5850 MHz, or other communications bands between 600 MHz and 5850 MHz (e.g., a frequency between 600 MHz and 6 GHz) or other suitable frequencies (as examples). The cellular telephone transceiver circuitry may handle voice data and non-voice data.

If desired, circuitry 62 may include satellite navigation system circuitry such as Global Positioning System (GPS) receiver circuitry for receiving GPS signals at 1575 MHz or for handling other satellite positioning data (e.g., GLONASS signals at 1609 MHz). Satellite navigation system signals for circuitry 62 are received from a constellation of satellites orbiting the earth. Circuitry 62 can include circuitry for other short-range and long-range wireless links if desired. For example, circuitry 62 may include circuitry for receiving television and radio signals, paging system transceivers, near field communications (NFC) transceiver circuitry (e.g., an NFC transceiver operating at 13.56 MHz or another suitable frequency), etc.

In NFC links, wireless signals are typically conveyed over a few inches at most. In satellite navigation system links, cellular telephone links, and other long-range links, wireless signals are typically used to convey data over thousands of feet or miles. In WLAN and WPAN links at 2.4 and 5 GHz and other short-range wireless links, wireless signals are typically used to convey data over tens or hundreds of feet. Antenna diversity schemes may be used if desired to ensure that the antennas that have become blocked or that are otherwise degraded due to the operating environment of device 10 can be switched out of use and higher-performing antennas used in their place.

Transceiver circuitry 62 may include ultra-wideband (UWB) transceiver circuitry that supports communications using the IEEE 802.15.4 protocol and/or other ultra-wideband communications protocols. In an IEEE 802.15.4 system, a pair of electronic devices may exchange wireless time stamped messages. Time stamps in the messages may be analyzed to determine the time of flight of the messages and thereby determine the distance (range) between the devices and/or an angle between the devices (e.g., an angle of arrival of incoming radio-frequency signals). UWB transceiver circuitry in circuitry 62 may operate at one or more ultra-wideband communications frequencies between about 5 GHz and about 8.3 GHz, between 3 GHz and 10 GHz, and/or at other frequencies (e.g., a 6.5 GHz UWB communications band, an 8 GHz UWB communications band, and/or bands at other suitable frequencies). As an example, device 10 may transmit and/or receive radio-frequency signals at ultra-wideband frequencies with external wireless equipment to determine a distance between device 10 and the external wireless equipment and/or to determine an angle of arrival of radio-frequency signals (e.g., to determine the relative orientation and/or position of the external wireless equipment with respect to device 10). The external wireless equipment may be an electronic device in system 8 such as device 10 or may include any other desired wireless equipment. Radio-frequency signals handled by device 10 in an ultra-wideband communications band and using an ultra-wideband communications protocol may sometimes be referred to herein as ultra-wideband signals. Radio-frequency signals transmitted and/or received by device 10 in other communications bands (e.g., using communications protocols other than an ultra-wideband communications protocol) may sometimes be referred to here as non-ultra-wideband (non-UWB) signals. Non-UWB signals handled by device 10 may include, for example, radio-frequency signals in a cellular telephone communications band, a WLAN communications band, etc.

Wireless circuitry 12C may include antennas 40. Antennas 40 may be formed using any suitable types of antenna structures. For example, antennas 40 may include antennas with resonating elements that are formed from loop antenna structures, patch antenna structures, inverted-F antenna structures, slot antenna structures, planar inverted-F antenna structures, helical antenna structures, dipole antenna structures, monopole antenna structures, hybrids of two or more of these designs, etc. If desired, one or more of antennas 40 may be cavity-backed antennas.

Different types of antennas may be used for different bands and combinations of bands. For example, one type of antenna may be used in forming a local wireless link antenna and another type of antenna may be used in forming a remote wireless link antenna. Dedicated antennas may be used for conveying radio-frequency signals in a particular band. For example, antennas 40 may be configured to handle only cellular telephone signals or only wireless local area network signals. If desired, antennas 40 may only handle signals for a UWB communications band (e.g., UWB signals) or antennas 40 can be configured to convey both radio-frequency signals in a UWB communications band and radio-frequency signals in non-UWB communications bands (e.g., wireless local area network signals and/or cellular telephone signals). Antennas 40 can include two or more antennas for handling signals in a given band signals (e.g., to implement a MIMO scheme). For example, at least two, at least four, or other set of multiple antennas 40 may be used by circuitry 62 to handle cellular signals.

Space is often at a premium in electronic devices such as device 10. In order to minimize space consumption within device 10, the same antenna 40 may be used to cover multiple communications bands. For example, each antenna 40 may be used to cover multiple cellular telephone bands between 600 MHz and 6 GHz and/or other suitable frequency range.

In general, transceiver circuitry 62 may include one or more radio-frequency transceivers (e.g., GPS receiver circuitry, WLAN/WPAN circuitry, cellular telephone transceiver circuitry, and/or UWB transceiver circuitry). Transceiver circuitry 62 may be coupled to antennas 40 using radio-frequency transmission line path such as radio-frequency transmission line paths 54.

To provide antenna structures such as antennas 40 with the ability to cover communications frequencies of interest, antennas 40 may be provided with circuitry such as filter circuitry (e.g., one or more passive filters and/or one or more tunable filter circuits). Discrete components such as capacitors, inductors, and resistors may be incorporated into the filter circuitry. Capacitive structures, inductive structures, and resistive structures may also be formed from patterned metal structures (e.g., part of an antenna). If desired, antennas 40 may be provided with adjustable circuits such as tunable components 50 to tune the antennas over communications (frequency) bands of interest. Tunable components 50 may be part of a tunable filter or tunable impedance matching network, may be part of an antenna resonating element, may span a gap between an antenna resonating element and antenna ground, etc.

Tunable components 50 may include switches, tunable inductors, tunable capacitors, and/or other adjustable components. Tunable components such as these may be based on switches and networks of fixed components, distributed metal structures that produce associated distributed capacitances and inductances, variable solid-state devices for producing variable capacitance and inductance values, tunable filters, or other suitable tunable structures. During operation of device 10, control circuitry 12 may issue control signals on one or more control paths that adjust inductance values, capacitance values, or other parameters associated with tunable components 50, thereby tuning antennas 40 to cover desired communications bands. Antenna tuning components that are used to adjust the frequency response of antennas 40 such as tunable components 50 may sometimes be referred to herein as antenna tuning components, tuning components, antenna tuning elements, tuning elements, adjustable tuning components, adjustable tuning elements, switches, or adjustable components.

Radio-frequency transmission lines 54 may include positive and ground signal paths. Radio-frequency transmission lines 54 may include coaxial cable transmission lines, stripline transmission lines, microstrip transmission lines, coaxial probes implemented using metalized vias, edge-coupled microstrip transmission lines, edge-coupled stripline transmission lines, waveguide structures (e.g., coplanar waveguides or grounded coplanar waveguides), combinations of these types of radio-frequency transmission lines and/or other transmission line structures.

If desired, the positive signal conductor and ground signal conductor of each radio-frequency transmission line 54 may be formed from metal traces on rigid and/or flexible printed circuits. In one suitable arrangement, radio-frequency transmission lines may include metal traces integrated within multilayer laminated structures (e.g., layers of a conductive material such as copper or other metal and a dielectric material such as a resin that are laminated together without or without intervening adhesive). The multilayer laminated structures may, if desired, be folded or bent in multiple dimensions (e.g., two or three dimensions) and may maintain a bent or folded shape after bending (e.g., the multilayer laminated structures may be folded into a particular three-dimensional shape to accommodate other device components and may be rigid enough to hold its shape after folding without being held in place by stiffeners or other structures).

A matching network (e.g., an adjustable matching network formed using tunable components 50) may include components such as inductors, resistors, and capacitors used in matching the impedance of each antenna 40 to the impedance of a respective radio-frequency transmission line 54. Matching network components may be provided as discrete components (e.g., surface mount technology components) or may be formed from housing structures, printed circuit board structures, traces on plastic supports, etc. Components such as these may also be used in forming filter circuitry in antenna 40 and may be tunable and/or fixed components. In some configurations, the presence of the user's head near antennas 40 may affect antenna performance (e.g., antenna resonating frequency and/or input impedance). Impedance matching circuitry for antennas 40 may be configured to help accommodate the altered impedance and other characteristics of the antennas while device 10 is being worn on the head and/or while device 10 is not being worn on the head. Switches in components 50 may, as an example, be adjusted depending on whether device 10 is in an on-head or off-head operating mode.

Radio-frequency transmission lines 54 may be coupled to antenna feed structures associated with antennas 40. As an example, each antenna 40 may form an inverted-F antenna, a slot antenna, a monopole antenna, a dipole antenna, or other antenna having an antenna feed 56 with a positive antenna feed terminal such as positive antenna feed terminal 58 and a ground antenna feed terminal such as ground antenna feed terminal 60. Other types of antenna feed arrangements may be used if desired. If desired, antennas 40 may be fed using multiple feeds each coupled to a respective port of radio-frequency transceiver circuitry 62 over a corresponding radio-frequency transmission line path. In some configurations, transmission line paths may be coupled to multiple locations on a given antenna (e.g., an antenna may include multiple positive antenna feed terminals coupled to a signal conductor of a radio-frequency transmission line). Switches may be interposed on the signal lines between radio-frequency transceiver circuitry 62 and the positive antenna feed terminals if desired (e.g., to selectively activate one or more positive antenna feed terminals at any given time). The illustrative feeding configuration of FIG. 3 is merely illustrative.

Control circuitry 12 may use information from a proximity sensor, wireless performance metric data such as received signal strength information, device orientation information from an orientation sensor, device motion data from an accelerometer or other motion detecting sensor, information about a usage scenario of device 10, information about whether audio and/or video is being played, information from one or more antenna impedance sensors, information on desired frequency bands to use for communications, and/or other information in determining when antennas 40 are being affected by the presence of nearby external objects or is otherwise in need of tuning. In response, control circuitry 12 may adjust an adjustable inductor, adjustable capacitor, switch, or other tunable components such as tunable components 50 to ensure that antennas 40 operate as desired. Adjustments to tunable components 50 may also be made to extend the frequency coverage of antennas 40 (e.g., to cover desired communications bands that extend over a range of frequencies larger than antennas 40 would cover without tuning).

Antennas 40 may include antenna resonating element structures (sometimes referred to herein as radiating element structures), antenna ground plane structures (sometimes referred to herein as ground plane structures, ground structures, or antenna ground structures), an antenna feed such as antenna feeds 56, and other components (e.g., tunable components 50). Antennas 40 may be configured to form any suitable type of antenna.

Figure 4:
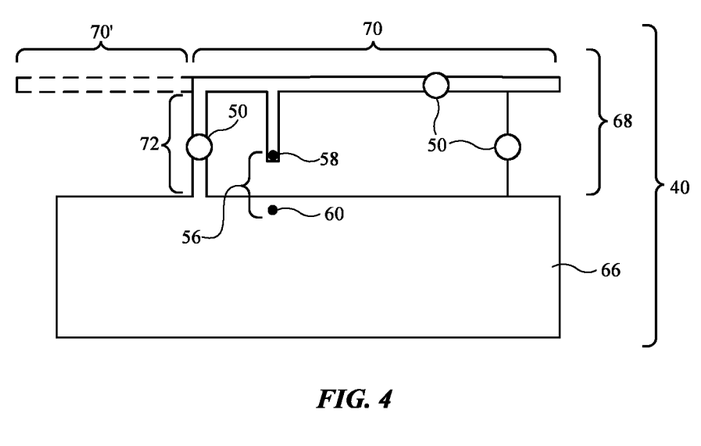
FIG. 4 is a diagram of an illustrative antenna for an electronic device in accordance with an embodiment.

FIG. 4 is a diagram of illustrative antenna structures that may be used in forming antennas 40. As shown in FIG. 4, antenna 40 may include an antenna resonating element such as antenna resonating element 68 (e.g., an inverted-F antenna resonating element) and an antenna ground (sometimes referred to herein as a ground plane) such as antenna ground 66. Antenna resonating element 68 may have a main resonating element arm such as arm 70. The length of arm 70 may be selected so that antenna 40 resonates at desired operating frequencies (e.g., where the length of arm 70 is approximately equal to one-quarter of the effective wavelength corresponding to a frequency in a communications band handled by antenna 40). Antenna resonating element 68 may also exhibit resonances at harmonic frequencies.

If desired, other conductive structures in the vicinity of arm 70 may contribute to the radiative response of antenna 40 (e.g., antenna 40 may include parasitic antenna resonating elements and/or the performance of antenna 40 may be influenced by conductive structures that are separate from arm 70 such as conductive portions of other antennas in the vicinity of antenna 40). Arm 70 may be separated from antenna ground 66 by a dielectric-filled opening (e.g., an air gap or polymer-filled gap). Antenna ground 66 may be formed from housing structures such as a conductive support plate, conductive portions of a display, conductive traces on a printed circuit board, metal portions of electronic components, or other conductive ground structures.

If desired, arm 70 may be coupled to antenna ground 66 by one or more return paths such as return path 72. Positive antenna feed terminal 58 of antenna feed 56 may be coupled to arm 70. Ground antenna feed terminal 60 may be coupled to antenna ground 66 (e.g., antenna feed 56 may run parallel to return path 72). If desired, antenna resonating element 68 may include more than one resonating arm to support radiation in multiple communications bands (e.g., antenna resonating element 68 may include one or more arms in addition to arm 70 such as additional arm 70' of FIG. 4). Each arm may help to support radiation in one or more respective communications bands. In one suitable arrangement, which may sometimes be described herein as an example, antenna resonating element 68 may include two arms (70 and 70') extending from opposing sides of antenna feed 56 and/or return path 72. Antenna resonating element arms such as arms 70 and/or 70' may have other shapes and may follow any desired path (e.g., paths having curved and/or straight segments). In some configurations, antenna resonating element structures such as arms 70 and/or 70' may be formed from housing structures (e.g., a peripheral conductive member that forms a ring-shaped frame for device 10 and/or that forms a display bezel for front-facing display 52 on front face F of device 10, metal housing frame members, and/or other metal housing structures).

Figure 5:
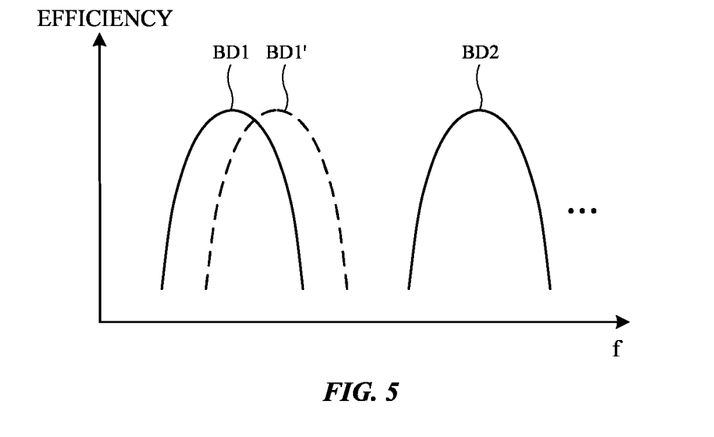
FIG. 5 is a graph in which antenna efficiency has been plotted as a function of operating frequency for an illustrative antenna in accordance with an embodiment.

If desired, antenna resonating element 68 may include one or more tunable components 50. As shown in FIG. 4, for example, components 50 may be coupled between arm 70 (and, if desired arm 70') and antenna ground 66, may be interposed in return path 72, may couple discrete segments of arm 70 (and/or arm 70') together, etc. Tunable components 50 may exhibit a capacitance, resistance, and/or inductance that is adjusted in response to control signals provided to the tunable components from control circuitry 12 (FIG. 2). FIG. 5 is an illustrative graph of antenna performance (antenna efficiency) versus frequency (e.g., a frequency range of 600 MHz to 6 GHz, frequencies above 6 GHz, frequencies below 600 MHz, etc.). As shown in FIG. 5, an antenna 40 may exhibit one or more frequency resonances such as frequency resonances BD1, BD2, . . . . Using adjustments to tunable components 50, one or more of these frequency resonances may be tuned during operation of device 10 to cover one or more desired additional frequencies of interest (see, e.g., frequency resonance BD1', which corresponds to a tuned version of frequency resonance BD1). Tunable components 50, the sizes, shapes, and locations of antennas 40, the locations of fixed impedance matching components for antennas 40, the antenna feeds for antennas 40, and/or other radio-frequency circuitry in device 10 may be configured to accommodate antenna loading effects due to the presence of a user's head against the rear surface of head-mounted device 10 (e.g., at a location that is typically within 0.5 to 10 cm of antennas 40). Antennas 40 may also be configured to radiate away from the rear of device 10 (if desired).

Figure 6:
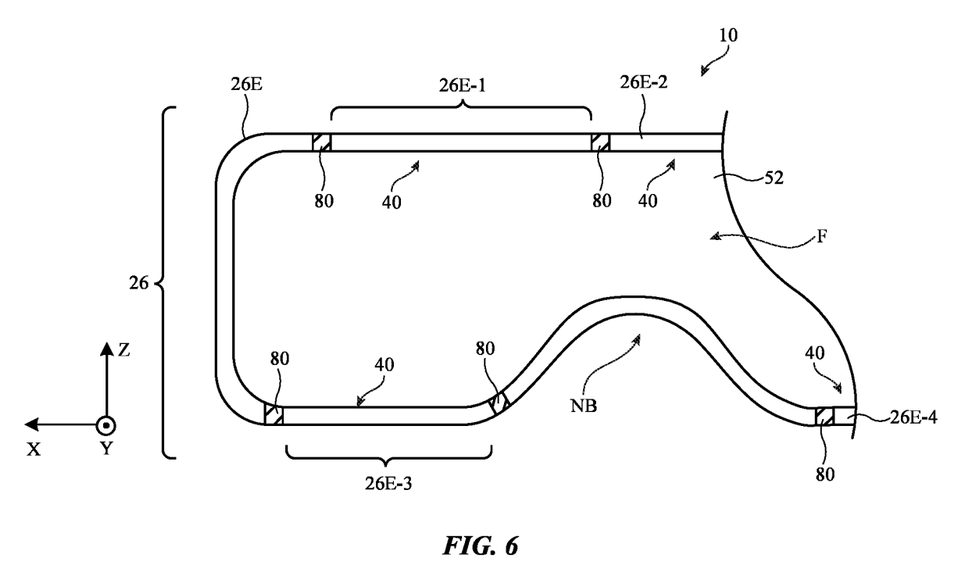
FIG. 6 is a front view of an illustrative head-mounted device with antennas in accordance with an embodiment.

FIG. 6 is a front view of a portion of device 10 in an illustrative configuration in which device 10 has antennas 40 formed from a ring-shaped peripheral conductive member (member 26E) that runs along the peripheral edge of front face F of device. In an illustrative configuration, outwardly facing (publicly viewable) display 52 (e.g., a touch screen display) is mounted on front face F of device 10 and faces forward in the +Y direction. Display 52 may be formed from a liquid crystal display panel, an organic light-emitting diode display panel, or other array of pixels and may be covered with a protective display cover layer. Display 52 faces away from the user when the user is wearing device 10. Member 26E may be formed from metal (e.g., stainless steel, aluminum, etc.) and/or other conductive materials and may serve as a protective ring-shaped member (e.g., a display bezel) for device 10 and display 14.

As shown in FIG. 6, member 26E may be divided into segments by dielectric-filled (e.g., polymer-filled) gaps 80. By incorporating multiple gaps 80 at various locations along the length of member 26E, segments of member 26E are formed that have lengths suitable for forming antenna resonating elements for antennas 40 (see, e.g., resonating element arms 70 and 70' of FIG. 4). Antenna ground structures may be formed from ground traces on printed circuits, conductive display structures in display 52, conductive housing structures (e.g., portions of support structure 26), and/or other ground elements. In the example of FIG. 6, peripheral conductive member 26E has been divided into multiple segments including upper edge segments 26E-1 and 26E-2 (e.g., segments adjacent, respectively to the user's right and left eyebrows) and lower edge segments 26E-3 and 26E-4 (e.g., segments formed along the lower peripheral edge of support structure 26 and display 52 on opposing sides of nose bridge portion NB of support structure 26. Portions of device 10 such as nose bridge portion NB may be configured to rest on the nose of the user to help support device 10 on the user's face. The illustrative peripheral conductive member segments of FIG. 6 may, as an example, be used to form four antennas 40 (e.g., cellular telephone antennas or other antennas) and may be operated in a MIMO antenna configuration.

Figure 7:
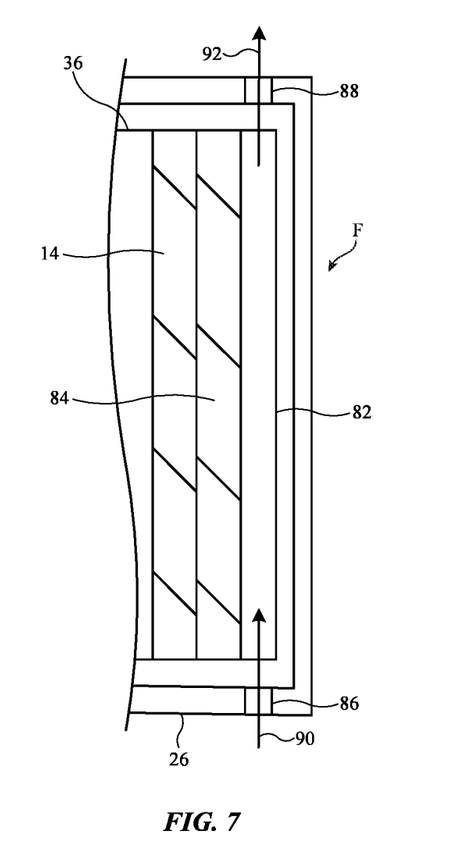
FIG. 7 is a side view of an illustrative head-mounted device with a fan for moving cooling air from an air inlet to an air outlet in accordance with an embodiment.

Device 10 may contain component cooling systems. Components such as displays 14 in optical modules 36 may generate heat. A pair of fans (e.g., left and right fans) with respective airflow inlet and airflow outlet ports may be used to help remove this heat. As shown in FIG. 7, for example, a fan such as fan 82 may be used to draw cooling air past a heat sink such as heat sink 84. Heat sink 84 may be mounted on the rear surface of display 14 in optical module 36 (as an example). Support structure 26 may have an airflow inlet such as inlet 86 and a corresponding airflow outlet such as outlet 88. During operation, fan 82 may draw air through inlet 86 in direction 90 and may expel the air through outlet 88 in direction 92, thereby cooling heat sink 84 and display 14.

Figure 8:
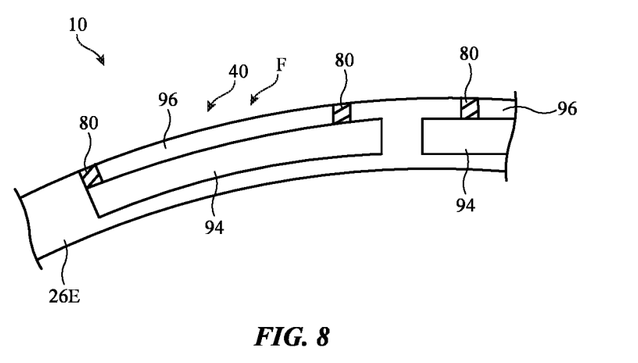
FIGS. 8 and 9 are top views of illustrative head-mounted device housing members with airflow ports and portions configured to form antennas in accordance with embodiments.

FIG. 8 is a view of a portion of device 10 showing how airflow ports such as ports 94 (e.g., airflow inlet ports 86 and/or airflow outlet ports 88) may be formed from elongated openings that run along part of the length of peripheral conductive member 26E of support structure 26 (e.g., along the upper or lower edge of device 10). Dielectric-filled gaps 80 may be located along the side of each port 94 to form conductive member segments 96 for forming antenna resonating elements 68 for antennas 40 (e.g., arms 70 and/or 70'). In the illustrative configuration of FIG. 8, each gap 80 extends through member 26E sufficiently to isolate a segment (e.g., segment 96) of member 26E that runs along the side of port 94, but does not penetrate through the entire thickness of member 26E, so that member 26E remains electrically continuous along its length.

Figure 9:
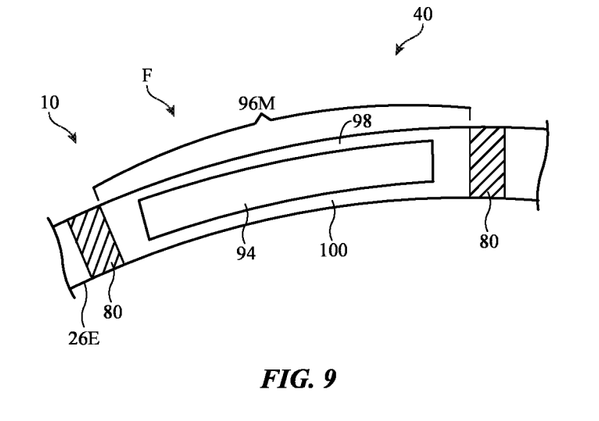

If desired, gaps 80 may pass entirely through member 26E (e.g., from the surface of member 26E on front face F to the opposing side of member 26E), as shown in FIG. 9. This creates double-sided segments 96M. Each port 94 may have an elongated shape with a curved profile that follows the curved shape of member 26E (e.g., a curved shape that helps device 10 accommodate the curved shape of the user's face). Each double-sided segment 96M may have a first elongated portion 98 extending along one side of port 94 and a second elongated portion 100 extending along an opposing side of port 94. The first and second portions are joined at each end of port 94, so that segment 96M completely surrounds the opening for port 94. Segment 96M and/or other antenna structures may be used in forming a resonating element arm for antenna 40 such as arm 70 of FIG. 4. The first and second portions of segment 96M (and therefore segments 96M) may have curved shapes (e.g., these curved structures follow the curvature of member 26E that is used to accommodate the curved cross-sectional profile of the user's face when viewed from above).

Figure 10:
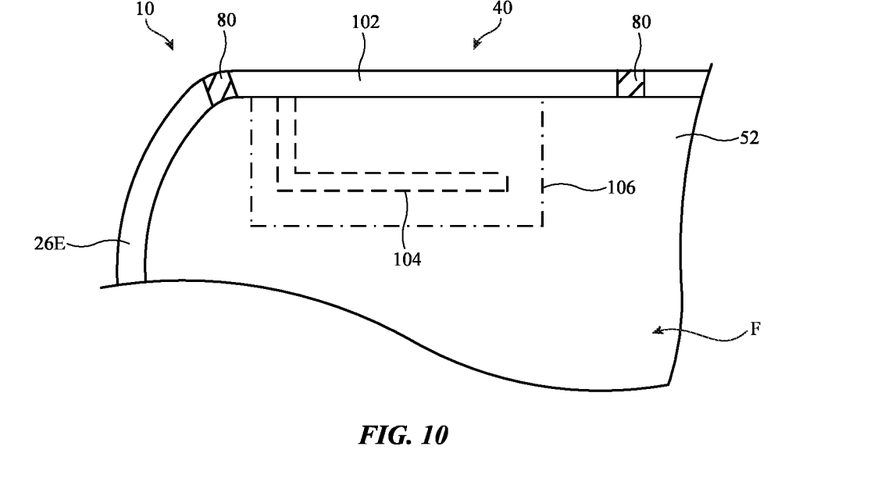
FIG. 10 is a front view of an illustrative head-mounted device with an antenna in accordance with an embodiment.

In the illustrative example of FIG. 10, antennas such as antenna 40 have been formed using segments of peripheral conductive member 26E (see, e.g., illustrative curved elongated conductive member segment 102 of peripheral conductive member 26E) and using supplemental antenna structures (e.g., conductive structure 104, which may form an additional antenna resonating element arm or other portion of antenna 40). As an example, segment 102 may form a first antenna resonating element arm or other antenna resonating element structure for antenna 40 and structure 104 may form a second antenna resonating element arm or other antenna resonating element structure for antenna 40. Structure 104 may be formed from a machined metal member, metal traces on a printed circuit substrate or other substrate (see, e.g., substrate 106), may be formed from metal foil, wire, and/or other conductive structures. In an illustrative configuration, antennas 40 may have antenna ground structures formed from metal traces on a printed circuit or other substrate (e.g., substrate 106), may have antenna ground structures formed from portions of support structure 26, and/or may have antenna ground structures formed from portions of display 52 (as examples).

In accordance with an embodiment, a head-mounted device is provided that includes a head-mounted support structure having a rear face and an opposing front face; rear-facing displays that are supported by the head-mounted support structure and that are configured to provide images viewable from eye boxes; a peripheral conductive member that extends along a peripheral edge of the head-mounted support structure on the front face; dielectric-filled gaps that separate the peripheral conductive member into segments; and an antenna formed from one of the segments of the peripheral conductive member.

In accordance with another embodiment, the peripheral conductive member forms an antenna resonating element arm for the antenna, the antenna includes an antenna ground and an antenna feed having a first feed terminal coupled to the antenna ground and a second feed terminal coupled to the antenna resonating element arm, the head-mounted device including cellular telephone radio-frequency transceiver circuitry; and a transmission line coupling the cellular telephone radio-frequency transceiver circuitry to the antenna resonating element arm.

In accordance with another embodiment, the head-mounted device includes a forward-facing display on the front face, the peripheral conductive member extends along a peripheral edge of the forward-facing display.

In accordance with another embodiment, the head-mounted support structure includes a headband.

In accordance with another embodiment, the peripheral conductive member includes an airflow port.

In accordance with another embodiment, the segment surrounds the airflow port.

In accordance with another embodiment, the peripheral conductive member has a first elongated metal portion that extends along a first side of the airflow port and has a second elongated metal portion that extends along an opposing second side of the airflow port.

In accordance with another embodiment, the first elongated metal portion forms the segment and the segment does not include the second elongated metal portion.

In accordance with another embodiment, the antenna includes a metal trace.

In accordance with another embodiment, the head-mounted device includes a printed circuit, the metal trace is formed on the printed circuit, and the metal trace is configured to form an antenna resonating element arm for the antenna.

In accordance with another embodiment, the peripheral conductive member includes an airflow port, the head-mounted device includes a heat sink coupled to one of the rear-facing displays; and a fan configured to cause air to flow through the airflow port to cool the heat sink.

In accordance with another embodiment, the segment has metal portions that surround an opening in the segment that forms the airflow port.

In accordance with another embodiment, the peripheral conductive member has a first elongated metal portion that extends along a first side of the airflow port and that forms the segment and has a second elongated metal portion that extends along an opposing second side of the airflow port and the second elongated metal portion is separated from the first elongated metal portion by the dielectric-filled gaps.

In accordance with an embodiment, a head-mounted device is provided that includes left and right optical systems each of which has a display and a lens, the left and right optical systems are configured to display images viewable respectively from left and right eye boxes; a head-mounted support structure that supports the left and right optical systems; radio-frequency transceiver circuitry; and an antenna coupled to the radio-frequency transceiver circuitry, the antenna includes a portion of the head-mounted support structure.

In accordance with another embodiment, the head-mounted support structure includes a peripheral conductive member that extends along a peripheral edge of a front face of the head-mounted support structure and the antenna includes a portion of the peripheral conductive member.

In accordance with another embodiment, the antenna includes a segment of the peripheral conductive member and first and second polymer-filled dielectric gaps in the peripheral conductive member are formed at opposing first and second ends of the segment.

In accordance with another embodiment, the head-mounted device includes a forward-facing display that is formed on the front face of the head-mounted support structure and that faces away from the left and right eye boxes, the peripheral conductive member extends along an edge of the front-facing display.

In accordance with an embodiment, a head-mounted device is provided that includes a head-mounted device having opposing front and rear faces; left and right rear-facing displays configured to display images in eye boxes; a peripheral conductive member that runs along a peripheral edge of the front face; dielectric-filled gaps that divide the peripheral conductive member into multiple segments; and a plurality of antennas on the front face each of which includes an antenna resonating element formed from a respective one of the multiple segments.

In accordance with another embodiment, the head-mounted device includes radio-frequency transceiver circuitry coupled to the plurality of antennas, the radio-frequency transceiver circuitry is configured to transmit and receive signals at a frequency between 600 MHz and 6 GHz.

In accordance with another embodiment, the head-mounted device includes a forward-facing display on the front face, the peripheral conductive member runs along an edge of the forward-facing display.

The foregoing is merely illustrative and various modifications can be made to the described embodiments. The foregoing embodiments may be implemented individually or in any combination.

What is claimed is:

1. A head-mounted device, comprising:
   a head-mounted support structure having a rear face and an opposing front face;
   rear-facing displays that are supported by the head-mounted support structure and that are configured to provide images viewable from eye boxes;
   a peripheral conductive member that extends along a peripheral edge of the head-mounted support structure on the front face, wherein the peripheral conductive member has an opening that forms an airflow port;
   first and second dielectric-filled gaps that separate the peripheral conductive member into segments; and
   an antenna formed from a given segment of the segments of the peripheral conductive member, wherein the given segment forming the antenna extends between the first and second dielectric-filled gaps and runs along at least one edge of the opening in the peripheral conductive member that forms the airflow port.

2. The head-mounted device defined in claim 1 wherein the peripheral conductive member forms an antenna resonating element arm for the antenna, wherein the antenna further comprises an antenna ground and an antenna feed having a first feed terminal coupled to the antenna ground and a second feed terminal coupled to the antenna resonating element arm, the head-mounted device further comprising:
   cellular telephone radio-frequency transceiver circuitry; and
   a transmission line coupling the cellular telephone radio-frequency transceiver circuitry to the antenna resonating element arm.

3. The head-mounted device defined in claim 2 further comprising a forward-facing display on the front face, wherein the peripheral conductive member extends along a peripheral edge of the forward-facing display.

4. The head-mounted device defined in claim 3 wherein the head-mounted support structure comprises a headband.

5. The head-mounted device defined in claim 1 wherein the airflow port passes air for a heat sink mounted to a back surface of one of the rear-facing displays.

6. The head-mounted device defined in claim 1 wherein the given segment forming the antenna surrounds the opening in the peripheral conductive member that forms the airflow port along four edges of the opening.

7. The head-mounted device defined in claim 1 wherein the peripheral conductive member has a first elongated metal portion that extends along a first side of the opening in the peripheral conductive member that forms the airflow port and has a second elongated metal portion that extends along an opposing second side of the opening in the peripheral conductive member that forms the airflow port.

8. The head-mounted device defined in claim 7 wherein the first elongated metal portion forms the given segment and wherein the given segment does not include the second elongated metal portion.

9. The head-mounted device defined in claim 1 wherein the antenna comprises a metal trace.

10. The head-mounted device defined in claim 9 further comprising a printed circuit, wherein the metal trace is formed on the printed circuit, and wherein the metal trace is configured to form an antenna resonating element arm for the antenna.

11. The head-mounted device defined in claim 1 further comprising:
    a heat sink mounted to a back side of one of the rear-facing displays; and
    a fan configured to cause air to flow through the airflow port to cool the heat sink.

12. The head-mounted device defined in claim 1 wherein the given segment has opposing metal portions that surround the opening in the peripheral conductive member that forms the airflow port.

13. The head-mounted device defined in claim 1 wherein the peripheral conductive member has a first elongated metal portion that extends along a first side of the opening in the peripheral conductive member that forms the airflow port and that forms the segment, wherein peripheral conductive member has a second elongated metal portion that extends along an opposing second side of the opening in the peripheral conductive member that forms the airflow port, and wherein the second elongated metal portion is separated from the first elongated metal portion by the first and second dielectric-filled gaps.

14. A head-mounted device, comprising:
left and right optical systems each of which has a display and a lens, wherein the left and right optical systems are configured to display images viewable respectively from left and right eye boxes;
a head-mounted support structure that supports the left and right optical systems;
radio-frequency transceiver circuitry;
an antenna coupled to the radio-frequency transceiver circuitry, wherein the antenna comprises a portion of the head-mounted support structure;
a heat sink mounted to a back surface of the display of the left optical system; and
an airflow port formed from an opening in the head-mounted support structure and configured to pass air to cool the heat sink, wherein the portion of the head-mounted support structure for the antenna runs along a side of the opening.

15. The head-mounted device defined in claim 14 wherein the head-mounted support structure comprises a peripheral conductive member that extends along a peripheral edge of a front face of the head-mounted support structure and wherein the portion of the head-mounted support structure for the antenna comprises a portion of the peripheral conductive member.

16. The head-mounted device defined in claim 15 wherein the antenna comprises a segment of the peripheral conductive member and wherein first and second polymer-filled dielectric gaps in the peripheral conductive member are formed at opposing first and second ends of the segment.

17. The head-mounted device defined in claim 14 wherein the portion of the head-mounted support structure for the antenna runs along another side of the opening.

18. A head-mounted device, comprising:
a head-mounted support structure having opposing front and rear faces;
left and right rear-facing displays configured to display images in eye boxes;
a peripheral conductive member that runs along a peripheral edge of the front face;
a forward-facing display on the front face, formed from an array of pixels, and separate from the left and right rear-facing displays, wherein the peripheral conductive member runs along an outer edge of the forward-facing display;
dielectric-filled gaps that divide the peripheral conductive member into multiple segments; and
a plurality of antennas on the front face each of which includes an antenna resonating element formed from a respective one of the multiple segments.

19. The head-mounted device defined in claim 18 further comprising radio-frequency transceiver circuitry coupled to the plurality of antennas, wherein the radio-frequency transceiver circuitry is configured to transmit and receive signals at a frequency between 600 MHz and 6 GHz.

20. The head-mounted device defined in claim 19 wherein the forward-facing display extends across a nose bridge portion of the head-mounted support structure.

* * * * *